United States Patent [19]
Fujimoto et al.

[11] Patent Number: 4,811,341
[45] Date of Patent: Mar. 7, 1989

[54] HIERARCHICAL DATA TRANSMISSION SYSTEM

[75] Inventors: Naonobu Fujimoto; Takashi Yorita, both of Kawasaki; Yoshiaki Yato, Mitaka; Yoshinori Nakamura; Kenji Satoh, both of Kawasaki, all of Japan

[73] Assignee: Fujitsu Limited, Kawasaki, Japan

[21] Appl. No.: 1,032

[22] Filed: Jan. 7, 1987

[30] Foreign Application Priority Data

Jan. 7, 1986 [JP] Japan .............................. 61-000308

[51] Int. Cl.⁴ ............................................... H04J 3/02
[52] U.S. Cl. ...................................... 370/112; 370/100
[58] Field of Search .......................... 370/112, 77, 100; 375/118, 119, 120

[56] References Cited

U.S. PATENT DOCUMENTS

| | | | |
|---|---|---|---|
| 3,909,541 | 9/1975 | Bobilin ................................. | 370/100 |
| 4,074,074 | 2/1978 | Boutmy et al. ...................... | 370/112 |
| 4,504,943 | 3/1985 | Nagano et al. ...................... | 370/112 |
| 4,604,582 | 8/1986 | Strenkowki et al. ................ | 370/108 |
| 4,685,106 | 8/1987 | Miller et al. ......................... | 370/112 |

Primary Examiner—Douglas W. Olms
Attorney, Agent, or Firm—Staas & Halsey

[57] ABSTRACT

A hierarchical data transmission system outputs a high speed second data train by step-by-step multiplexing a plurality of first data trains. A first signal processing part operates at the processing speed corresponding to the first data train, a third signal processing part operates at the processing speed corresponding to the second data train, and a second signal processing part operates at the processing speed corresponding to the intermediate speed of the first data train and second data train. A first clock signal of the speed corresponding to the processing speed of the third signal processing part, a second clock signal of the speed corresponding to the processing speed of the second signal processing part by dividing the first clock signal, and a third clock signal of the speed corresponding to the processing speed of the third signal processing part are generated the first signal processing part operates in association with the third signal processing part, by dividing the second clock signal after the phase adjustment with reference to the phase information of the first clock signal.

9 Claims, 7 Drawing Sheets

HIERARCHICAL DATA TRANSMISSION SYSTEM

BACKGROUND OF THE INVENTION (1) Field of the invention

The present invention relates to a hierarchical data transmission system in which a plurality of data trains are multiplexed and transmitted from a transmitter side thereof and the thus transmitted data trains are received at a receiver side thereof and demultiplexed therein to reproduce the original data trains.

A hierarchical data transmission system basically comprises a side for dealing with data of a low order group and a side for dealing with data of a high order group. The high order group of data is produced by summing at least two low order groups of data, so that the high order group of data provides a very high transmission rate, and accordingly, the high order group contains a great amount of data.

(2) Description of the related art

A current optical fiber data transmission system has realized such ultra-high speed data transmission as 405 Mbps or 810 Mbps and a multiplexing apparatus is put into practical use in order to obtain such ultra-high speed data at the high order group signals.

In such a multiplexing apparatus, a plurality of low order group data trains are multiplexed into a plurality of intermediate speed data trains. Thereafter, these intermediate speed data trains are further multiplexed into high order group data trains. This procedure is also employed for demultiplexing the high order group data train. Such multiplexing apparatus can be mounted into an LSI unit of the function corresponding to the data transmission rate.

In such a case, an LSI for processing high order group data trains operates with a high speed clock signal, an LSI for processing intermediate data trains operates with an intermediate speed clock signal, and an LSI for processing low order group data trains operates with a low speed clock signal.

The low speed clock signal in the LSI for processing low order group data trains can be formed by the frequency division of the intermediate speed clock signal in the LSI for processing the intermediate data trains, and this intermediate speed clock signal can be formed by the frequency division of the high speed clock signal in the LSI for processing the high order group data trains.

FIG. 1 is a block diagram illustrating the structure of the multiplexing apparatus described above, while FIG. 2 is a timechart which indicates operation timings of respective portions.

The multiplexing apparatus of FIG. 1 multiplexes the 9-channel low order group data trains of 45 Mbps and outputs high order group signals of 405 Mbps. For multiplexing, the low order group data train of each channel, as the main signal, is synchronized to form a frame. Moreover, a frame synchronization signal and service channels for monitor and control which form subsignal must be inserted. These processings cannot be realized easily for the ultra-high speed data train as high as 405 Mpbs. Therefore, as shown in FIG. 1, the three intermediate speed data trains of 135 Mbps are respectively generated by multiplexing the 3-channel low order group data trains the synchronization signal of each channel and service channels are inserted at this stage, and thereafter the three intermediate speed data trains are interleaved to output the high order group data train of 405 Mbps.

In FIG. 1, the high speed operation clock of 405 Mbps is supplied, from the oscillator 4, to the multiplexing circuit MUX2 which generates the high order group data trains of 405 Mbps, and the intermediate speed operation clock of 135 Mbps which as been obtained by dividing the high speed clock sent from OSC 4 into ⅓ with a frequency divider F-DIV5 is supplied to the multiplex circuit MUX1 which generates the intermediate speed data trains of 135 Mbps. Moreover, the intermediate speed clock sent from F-DIV5 and a low speed operation clock of 45 Mbps which is obtained by dividing said intermediate speed clock into ⅓ with the frequency divider F-DIV6 is supplied to the interface circuits 11~19 for the low order group data trains of CH1~CH9. The data train service channels (for monitoring and controlling the transmitting lines and repeaters of 405 Mbps) to be multiplexed together with the low order group data trains (CH1~CH9) is 710 kbps, in this case, and this data train for service channels can be generated by multiplexing the low order group data trains of 11 channels of 64 kbps by the multiplexing circuit for service channel S-CHMUX3. The low speed operation clock for S-CHMUX3 can be obtained by dividing the low speed clock sent from F-DIV6 into 1/64 with the frequency-divider F-DIV7.

Interface 11~19 and S-CHMUX3 output a bit position information (timing signal) which is required for multiplexing at MUX1, MUX2 and this bit position information is input to MUX1 and MUX2. Namely, the multiplexing circuits MUX1, MUX2, S-CHMUX3 and interface circuits 11~19 are operating under the synchronized condition and the clock signal supplied from OSC4, F-DIV5, 6, 7 is the reference signal for such synchronization.

Here, as explained above, MUX1, MUX2, S-CHMUX3, interface circuits 11~19 are respectively mounted to LSI's and the clock signal is supplied from an external circuit. Since respective LSI's must be operated synchronously, although the operation speeds of LSI's are quite different, the clock obtained by sequentially dividing the reference clock of OSC4 is used as the clock signal.

However, the structure illustrated in FIG. 1 is accompanied by the following problems.

In case the high speed reference clock output from OSC4 like FIG. 1(1) is divided by F-DIV5, it is affected by the delay in signal propagation and operation of F-DIV5, so that an output of F-DIV5 is delayed by "a" in the phase (the rise timing of clock) in comparison with an output of OSC4 as shown in FIG. 2(2). Moreover, an output of F-DIV6 obtained by dividing an output of F-DIV5 is delayed, as shown in FIG. 2(3), by a+b in the phase in comparison with an output of OSC4, because delay (b) is accumulated. A delay in signal propagation and operation of interface circuit 11 is further accumulated in the CH1 timing signal 111 which is generated based on the clock signal sent from F-DIV6, so that the output of interface circuit 11 is delayed by "a+b+c" in the phase in comparison with an output of OSC4 as shown in FIG. 2(4). Similarly, the delay (b') is accumulated on an output of F-DIV7 obtained by dividing an output of F-DIV6 as shown in FIG. 2(5) and the delay (c') is also accumulated on the service channel timing signal 133 generated based on the clock sent from F-DIV7 and is output from S-CHMUX3 as shown in FIG. 2(6). Furthermore, in the timing signal based on the timing signals 111, 133 generated by MUX1, the delay (d) in propagation of signal and operation of MUX1 is accumulated to the delay $(a+b''+c'')$, as shown in FIG. 2(7), which includes the influence of both delay $(a+b+c)$ of an output of interface circuit 11 and delay $(a+b+b'+c')$ of an output of S-CHMUX3. Finally, further the delay (e) is accumulated, as shown in FIG. 2(8), to the timing signal used within MUX2 which generates the high order group data train.

Therefore, as shown in FIG. 2(9), the timing signal used by MUX2 allows accumulation of a delay of $(a+b''+c''+d+e)$ in comparison with the phase of reference high speed clock of OSC4. As shown in FIG. 2(9), MUX2 outputs the high order group data train 1, 2, 3 ... in synchronization with the high speed clock (output of OSC4), but as shown in FIG. 2(8), when the timing signal used within MUX2 is delayed by $(a+b''+c''+d+e)$ in comparison with the phase of high speed clock and when $(a+b''+c''+d+e) > T$ (T is a period of high speed clock), the signal 1' is output in the timing where the signal 2 should be output. Therefore, the normal multiplex processing cannot be realized within MUX2.

In the case of demultiplexing the high order group data train into a plurality of low order group data trains, only the transmission direction of the high order group data train of 405 Mbps, intermediate speed data trains of 135 Mbps, low order group data train of 45 Mbps and service channel data train of 0.7 Mbps is reversed in FIG. 1 and the same structure is employed for the clock signal and timing signal. Therefore, this structure has a problem similar to that of the foregoing multiplex apparatus.

Above problems are generated, in the multiplex apparatus for ultra-high speed data train which sequentially multiplexes the low order group data trains in a plurality of stages, because the delay times are accumulated by sequentially dividing the reference high speed clocks for the LSI having a plurality of processing speeds.

SUMMARY OF THE INVENTION

Therefore, it is an object of the present invention to eliminate influence of delay by frequency division of the reference high speed clock and realize operation of the multiplexing circuits at the normal timing in the multiplexing apparatus providing a plurality of the multiplexing circuits having a plurality of processing speeds.

The present invention provides a hierarchical data transmission system which obtains a high speed second data train step-by-step multiplexing a plurality of first data trains, comprising;

a first signal processing part which operates at the processing speed corresponding to the first data train, a third signal processing part which operates at the processing speed corresponding to the second data train, a second signal processing part which operates at the processing speed corresponding to the intermediate speed of the first data train and second data train, a first clock signal generating means which outputs a first clock signal of the speed corresponding to the processing speed of the third signal processing part, a second clock signal generating means which generates a second clock signal of the speed corresponding to the processing speed of the second signal processing part by dividing the first clock signal, and a third clock signal generating means which generates a third clock signal of the speed corresponding to the processing speed of the third signal processing part, when the first signal processing part operates in association with the third signal processing part, by dividing the second clock signal after the phase adjustment with reference to the phase information of the first clock signal.

BRIEF DESCRIPTION OF THE DRAWINGS

The like parts are given the like reference numerals throughout the drawings.

DESCRIPTION OF THE PREFERRED EMBODIMENTS

As is explained in detail with reference to FIGS. 1 and 2, delay time is accumulated because the intermediate and low speed clock signals are generated by sequentially dividing the reference high speed clock signal. Therefore, in the present invention, phase (rise timing) of clock signal is adjusted in the dividing circuit which generates a low speed clock, based on the reference high speed clock.

Figure 3:
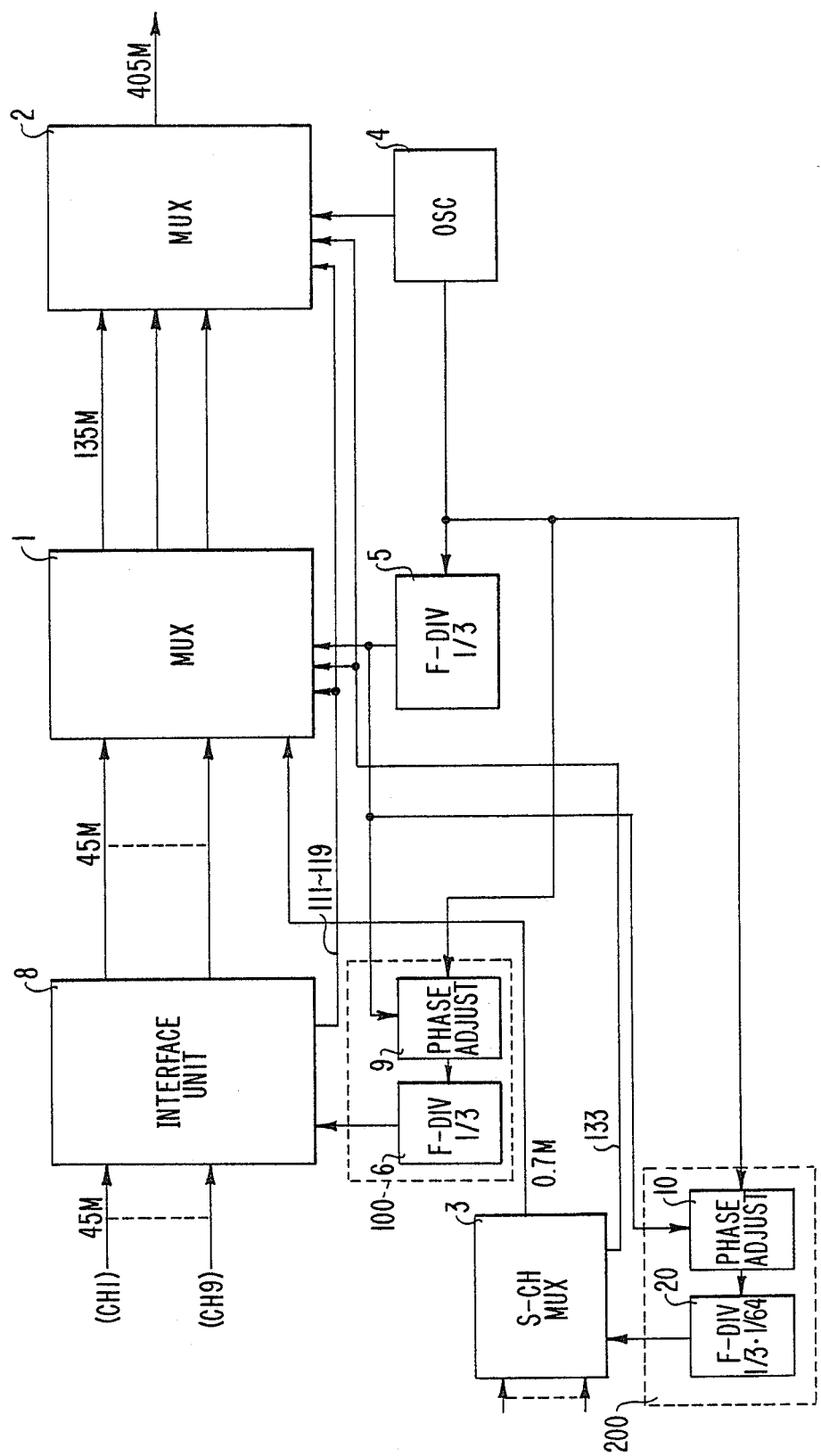
FIG. 3 is a block diagram of an embodiment of the present invention.
Figure 4:
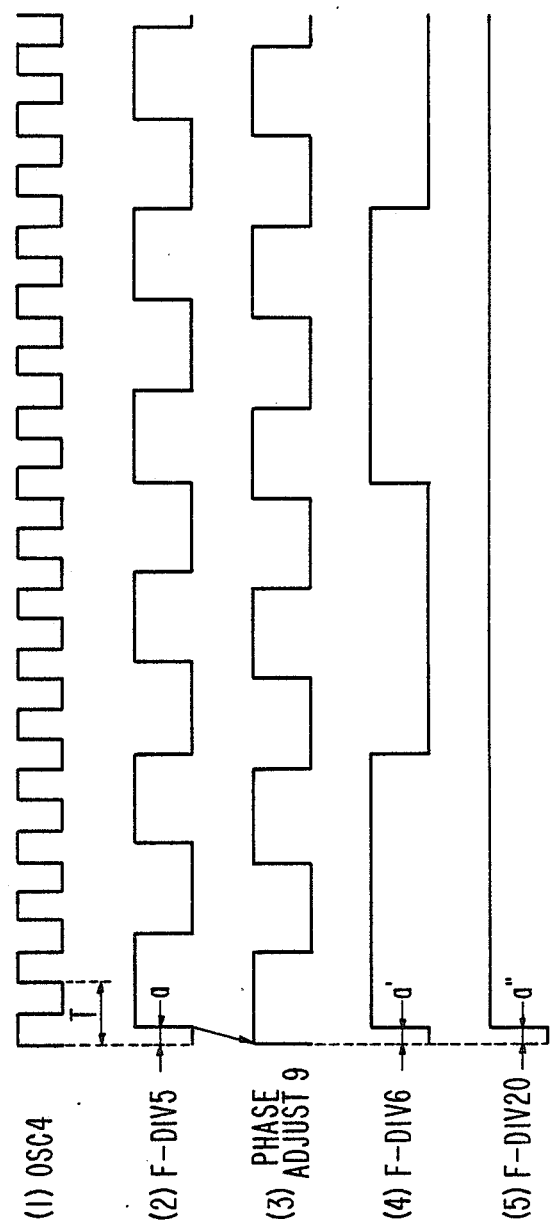
FIG. 4 is a timing chart indicating signal waveforms at respective points in FIG. 3.

FIG. 3 is a block diagram of a multiplexing apparatus of the present invention and FIG. 4 is a timing chart indicating signal waveforms at respective points in FIG. 3. Since a method for multiplexing the low order group data trains of CH1~CH9 and service channel signal (0.7 Mbps) is the same as that explained for FIG. 1 it is not explained here.

The reference high speed clock signal is output from the oscillator OSC4. (FIG. 4(1)) The high speed clock signal output from OSC4 is supplied to the multiplexing circuit MUX2, and is also input to the frequency-divider F-DIV 5 which generates the intermediate speed clock, a clock generating part 100 which generates the low speed clock of 45 Mbps and a clock generating part 200 which generatates the low speed clock of 0.7 Mbps.

The clock generating part 100 adjusts the phase of the intermediate speed clock signal input from F-DIV5 by the phase adjust circuit 9, based on the high speed clock sent from OSC4. In this embodiment, as shown in FIG. 4(2), the phase of intermediate clock is advanced by the phase adjust circuit 9 so that the phase of intermediate speed clock including the delay (a) in propagation of signal and operation of F-DIV5 is matched with the phase of high speed clock. (FIG. 4(3))

Operations of the phase correction circuit 10 of clock generating part 200 which generated the clock of 0.7 Mbps are similar to that explained above. Therefore the low speed clock signal supplied from F-DIV6 to respective interface circuits INTF8 of CH1~CH9 allows addition of only delay (a') in operation of F-DIV6 and it becomes the clock having almost the same condition as the intermediate speed clock signal output from F-DIV5, namely being delayed when it passes a single circuit.

Therefore, MUX1 and interface circuits 8 can operate based on clock signals having almost the same condition, namely including a delay time added when such signals pass a single circuit, and accumulation of delay can be prevented. Phase of the low speed clock signal output from the clock generating part 200 can also be adjusted in the same way. (FIG. 4(5))

As explained with reference to FIG. 3, the low speed clock is genenerated after the phase of intermediate speed clock output from F-DIV5 is matched to the phase of high speed clock signal because it is required that S-CHMUX3 and interface circuits 8 are operated based on clock signals which are delayed almost in the same degree.

For example, if delay in propagation and delay in operation of timing signals 111~119, 133 to MUX1, MUX2 output from interface circuits 8, S-CHMUX3 are large in comparison with MUV1 and adjustment of delay time is insufficient even when the phase of the intermediate clock signal is matched with the high speed clock signal, it can be covered by leading the phase of intermediate clock signal by ½ period or one period than the phase of high speed clock signal.

Figure 5:
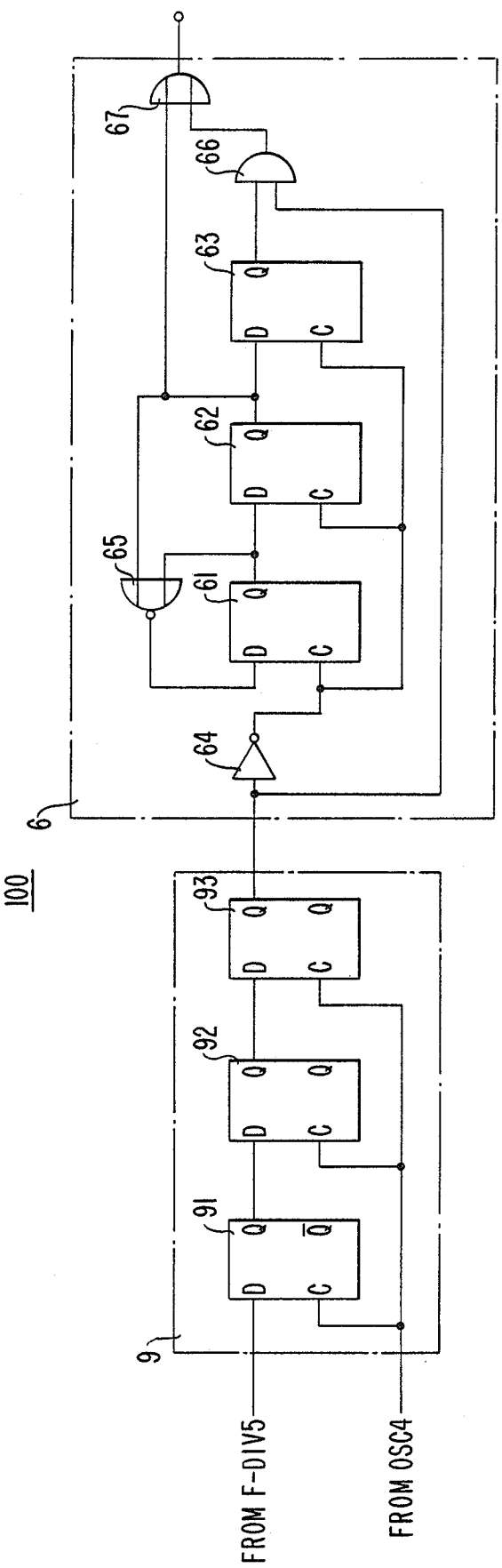
FIG. 5 is a circuit diagram of a frequency dividing circuit in FIG. 3.

Next, a practical circuit structure of the clock generating part 100 is illustrated in FIG. 5.

The circuit of FIG. 5 is explained with reference to the timing chart of FIG. 6 which indicates operation waveforms at respective points of FIG. 5.

A phase adjust circuit 9 is formed by three stages of cascade-connected flip-flops (FF). The intermediate speed clock signal (FIG. 6(2)) is input to the D input of the first stage FF91 from F-DIV5 and the reference high speed clock signal (FIG. 6(1)) is input to the C input from OSC4. Therefore, the Q output of FF91 becomes the intermediate speed clock signal which is delayed in the phase by one period T from the high speed clock signal as indicated by FIG. 6(3). The Q output of FF91 is then input to the D input of FF92, the Q output of FF92 is then input sequentially to the D input of FF93 and respective outputs are as shown in FIGS. 6 (4),(5). The phase of intermediate speed clock signal output from FF93 is finally delayed by three periods 3T from the phase of high speed clock signal, namely this intermediate speed clock signal is matched in the phase with the high speed clock signal.

The phase-adjusted intermediate speed clock signal output from FF93 is input to a 3 frequency-divider F-DIV6. As shown in FIG. 5, F-DIV6 is a ternary ring counter and FF61, 62, 63 respectively, output the signals in different phases and duty ratio of ⅓ obtained by dividing the intermediate speed clock signal into ⅓. (FIGS. 6(7),(8)) The AND gate 66 and OR gate 67 are provided for setting a duty ratio to ⅓. As shown in FIG. 6(9), the low speed clock signal obtained by dividing the high speed clock signal into 1/9 can be output from the OR gate 67. The low speed clock signal indicated as FIG. 6 (9) is described neglecting delay in operation of ring counter 6 (F-DIV6). As shown in FIG. 6(10), the low speed clock signal output from the OR gate 67 actually includes delay (a') in operation of the ring counter 6 (F-DIV6).

Figure 6:
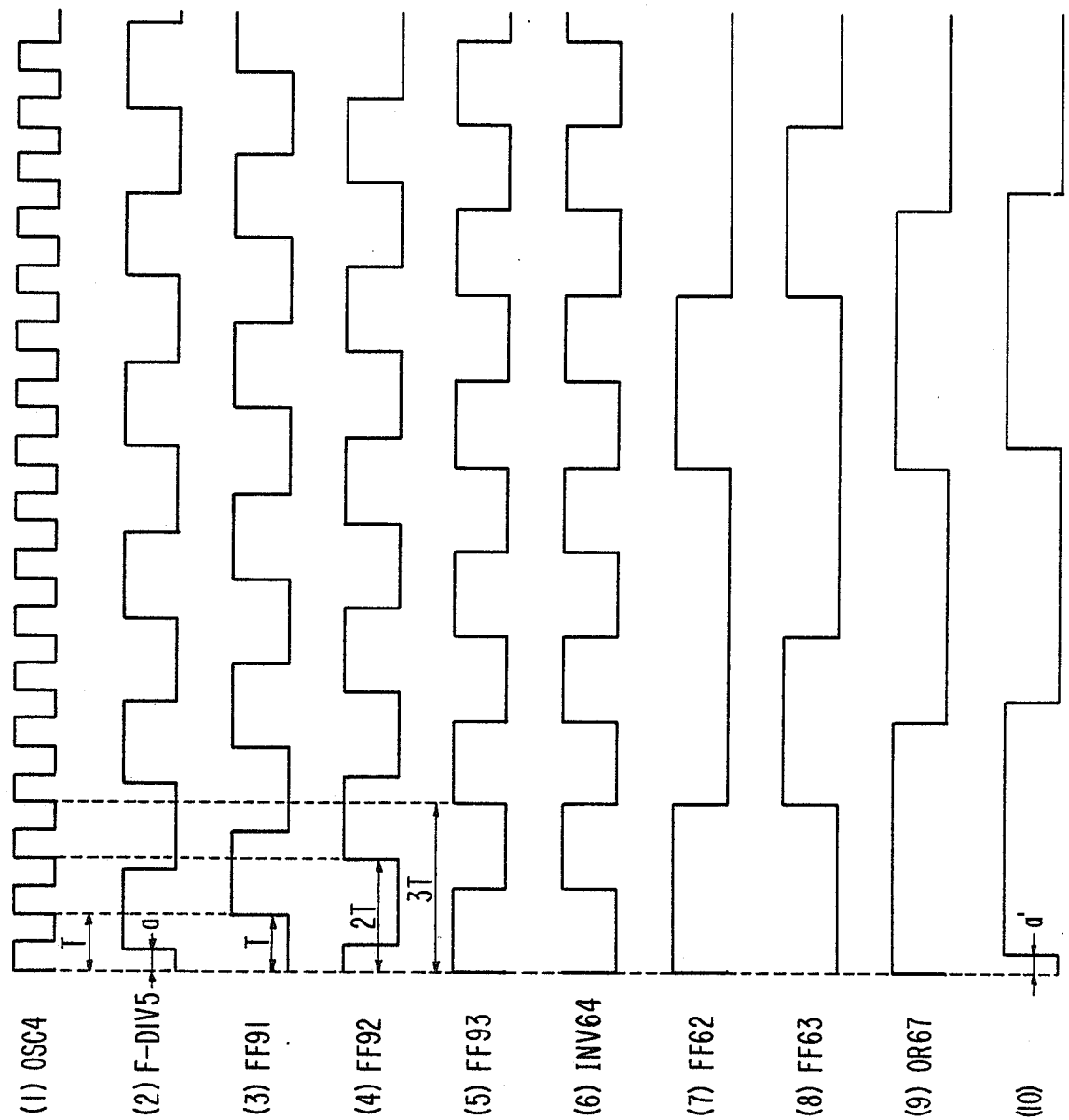
FIG. 6 is a timing chart indicating signal waveforms at respective points in FIG. 5.

In the above explanation, the phase adjust circuit 9 matches the phase of intermediate speed clock signal with that of the high speed clock signal, but the Q output of FF91 is used as the intermediate speed clock signal in FIG. 5 on the occasion of obtaining the intermediate speed clock signal which is leading the phase of the high speed clock signal by ½ period (FIG. 6(3)) and moreover, the Q output of FF92 is used as the intermediate speed clock signal on the occasion of obtaining the intermediate speed clock signal which is leading the phase of the high speed clock signal by one period. (FIG. 6(4))

Figure 7:
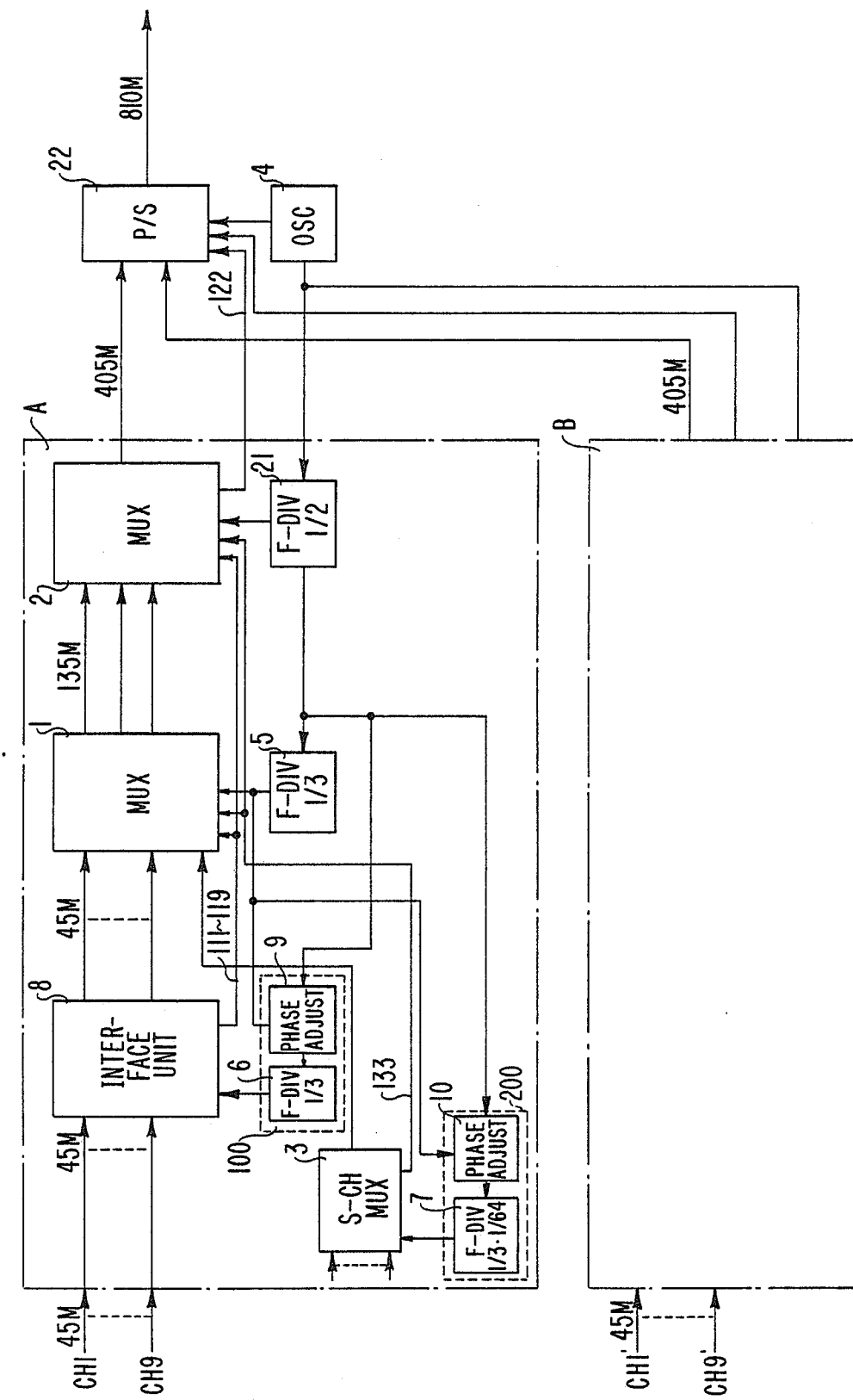
FIG. 7 is a block diagram of another embodiment of the present invention.

FIG. 7 illustrates a block diagram of multiplexing apparatus in accordance with another embodiment of the present invention. The multiplexing apparatus shown in FIG. 7 further multiplexes the high order group data trains of 405 Mbps output from the multiplexing apparatuses A, B (having the same structure as the multiplexing apparatus shown in FIG. 3) for two channels and thereby generates the high order group data train of 810 Mbps. The multiplexing circuit 22 which multiplexes the 405 Mbps of two channels output from the multiplexing apparatuses A, B is formed by a parallel/series converter which converts the 2-channel 405 Mbps data trains input in parallel into the series data train to be output alternately bit by bit. The operation clock of 810 Mbps of the multiplexing circuit 22 is output from the oscillator OSC4'. The operation clock of 405 Mbps of the multiplexing circuit MUX2 of the multiplexing apparatuses A, B is obtained by dividing the ultra-high speed clock signal of 810 Mbps output from OSC4' into ½. Structures of the other multiplexing apparatuses A, B are same as that of FIG. 3.

In the structure of FIG. 7, only the timing signal 122 sent from MUX2 is input to the multiplexing circuit 22 and the timing signals 111~119, 133 sent from interface circuits 8, S-CHMUX3 are input to MUX1, MUX2 as in the case of the structure of FIG. 3. Therefore, operation clock of MUX2 is generated with reference to the phase of clock signal of OSC4', while the operation clock of interface circuits 8, S-CHMUX3, MUX1 is generated with reference to the phase of high speed clock signal output from F-DIV21 as the operation clock of MUX2.

Namely, on the occasion of generating the operation clock of respective signal processing parts (interface circuits 8, S-CHMUX3, MUX1, MUX2), the reference clock signal for phase adjustment is the operation clock of the high speed signal processing part among those to which respective signal processing parts supply the timing signals. In other words, in the structure of FIG. 7, delay time of the timing signals 111~119, 133 output from INTF8, S-CHMUX3 does not apply any influence to operations of the multiplex part 22.

What is claimed is:
1. A hierarchical data transmission system which hierarchically multiplexes a plurality of first data trains and obtains a higher speed second data train than the first data trains, comprising:
   first signal process means for operating at a processing speed corresponding to the first data trains;
   second processing means for operating a processing speed corresponding to the second data train;
   third signal processing means for operating at a processing speed corresponding to an intermediate speed between the processing speed corresponding to the first data trains and the processing speed corresponding to the second data train;

second clock signal generating means for outputting a second clock signal of the speed corresponding to the processing speed of said second signal processing means;

third clock signal generating means for generating a third clock signal of the speed corresponding to the processing speed of said third signal processing means by dividing the second clock signal;

phase adjusting means for compensating a phase delay of the third clock signal with reference tot he phase information of the second clock signal, and for supplying the compensated third clock signal as an output; and first signal generating means for generating a first clock signal of the speed corresponding to the processing speed of said first signal processing means by dividing the compensated third clock signal.

2. A hierarchical data transmission system as set forth in claim 1, wherein:

the first data trains comprise a plurality of main signal trains forming the main signal and a plurality of sub-signal trains forming monitoring and line controlling signals for the second data train; and said first signal processing means comprises an interface means for the plurality of main signal trains, and a first multiplexing circuit which multiplexes the plurality of sub-signal trains.

3. A hierarchical data transmission system as set forth in claim 2:

the first clock signal comprises a first low speed clock signal which is the clock signal of said interface means and a second low speed clock signal which is the clock signal of said first multiplexing circuit,;

said first clock generating means comprises a first low speed clock generating means which supplies the first low speed clock signal to said interface means and a second low speed clock signal generating means which supplies the second low speed clock signal to said first multiplexing circuit.

4. A hierarchical data transmission system as set forth in claim 3, wherein said third signal processing means comprises a second multiplexing circuit which multiplexes the signal input from said interface means and said first multiplexing circuit into a plurality of third data trains having the same speed as the second clock signal, and said second signal processing means comprises a third multiplexing circuit which outputs the higher speed second data train by further multiplexing the third data trains.

5. A hierarchical data transmission system as set forth in claim 1, wherein said phase adjusting means matches a phase of the third clock signal with a phase of the second clock signal or advances the phase of the third clock signal forward to the phase of the second clock signal within one period.

6. A hierarchical data transmission system which hierarchically demultiplexes a second data train and obtains a plurality of first data trains of lower speed than the second data train, comprising:

first signal processing means for operating at a processing speed corresponding to the first data trains;

second signal processing means for operating at a processing speed corresponding to the second data train;

third signal processing means for operating at a processing speed corresponding to an intermediate speed between the processing speed corresponding to the first data trains and the processing speed corresponding to the second data train;

second clock signal generating means for outputting a second clock signal of the speed corresponding to the processing speed of said second signal processing means;

third clock signal generating means for generating a third clock signal of the speed corresponding to the processing speed of said third signal processing means by dividing the second clock signal;

phase adjusting means for compensating a phase delay of the third clock signal with reference to the phase information of the second clock signal, and for supplying the compensated third clock signal as an output; and first clock signal generating means for generating a first clock signal of the speed corresponding to the processing speed of said first signal processing means by dividing the compensated third clock signal.

7. A hierarchical data transmission system as set forth in claim 6, wherein:

the first data trains comprise a plurality of main signal trains forming a main signal and a plurality of sub-signal trains forming monitoring and line controlling signals for the second data train; and said first signal processing means comprises an interface circuit for the plurality of main signal trains and a first demultiplexing part which demultiplexes the plurality of sub-signal trains.

8. A hierarchical data transmission system as set forth in claim 7, wherein the first clock signal comprises a first low speed clock signal which is the clock signal of said interface circuit and a second low speed clock signal which is the clock signal of said first demultiplexing part;

said first clock generating means comprises a first low speed clock generating means which supplies a first low speed clock signal to said interface and a second low speed clock signal generating means which supplies a second low speed clock signal to said first demultiplexing part.

9. A hierarchical data transmission system as set forth in claim 8, wherein said third signal processing means comprises a second demultiplexing part which demultiplexes and outputs a plurality of third data trains at a speed which is the same as the third clock signal, from the signals to be input to said interface circuit and said first demultiplexing part, and said first signal processing means comprises a third demultiplexing part which demultiplexes said first data train and outputs the third data trains.

* * * * *

UNITED STATES PATENT AND TRADEMARK OFFICE
CERTIFICATE OF CORRECTION

PATENT NO. : 4,811,341

DATED : MARCH 7, 1989

INVENTOR(S) : NAONOBU FUJIMOTO ET AL.

It is certified that error appears in the above-identified patent and that said Letters Patent is hereby corrected as shown below:

FRONT PAGE [57] ABSTRACT, line 16, "generated the" should be --generated. The--.

Col. 1, line 66, "trains" should be --trains,--.

Col. 2, line 7, "as" should be --has--;
    line 28, after "Interface" insert --circuits--.

Figure 1:
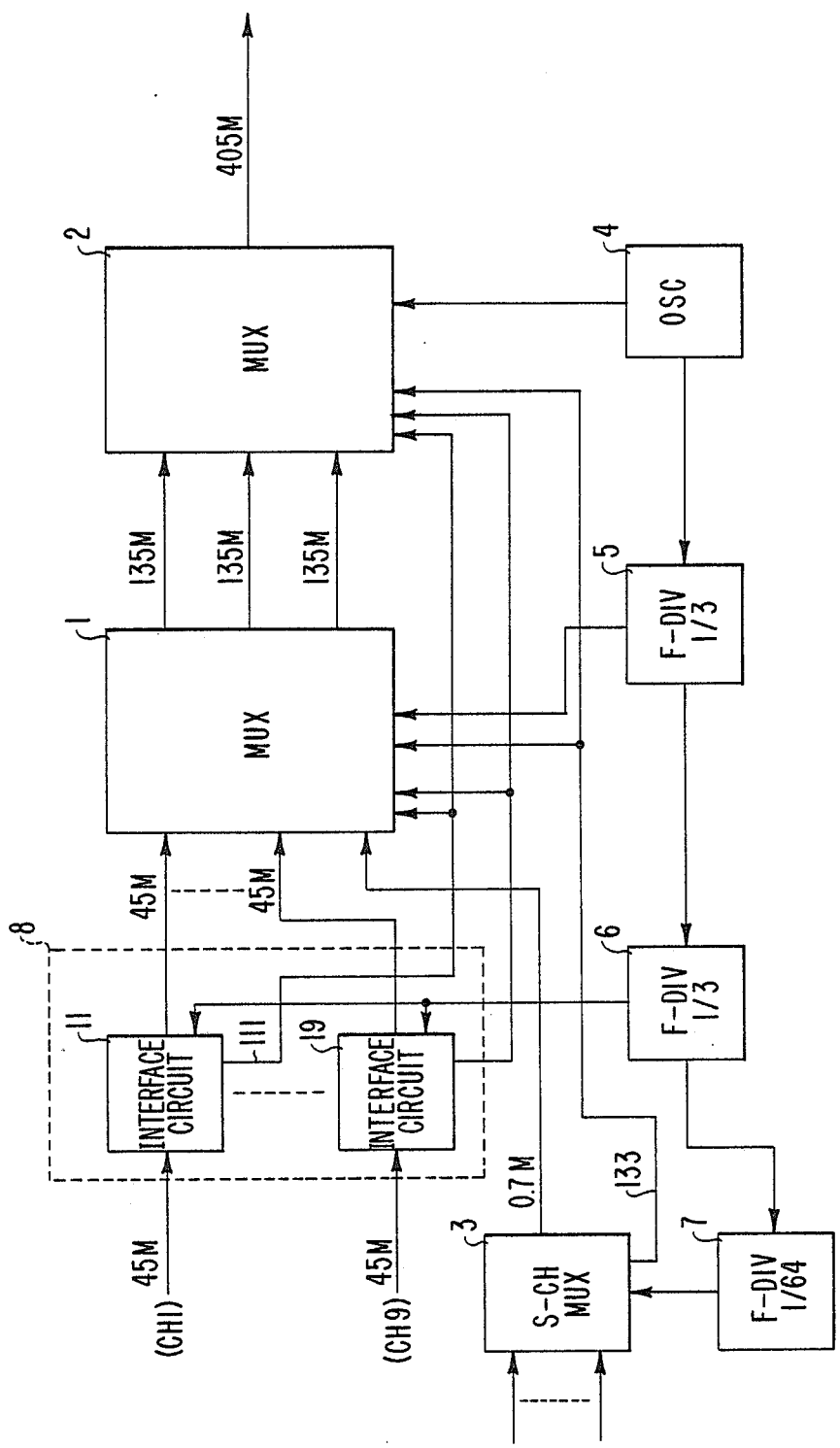
FIG. 1 is a block diagram of a multiplexing apparatus which multiplexes low order group data trains in a plurality of steps.
Figure 2:
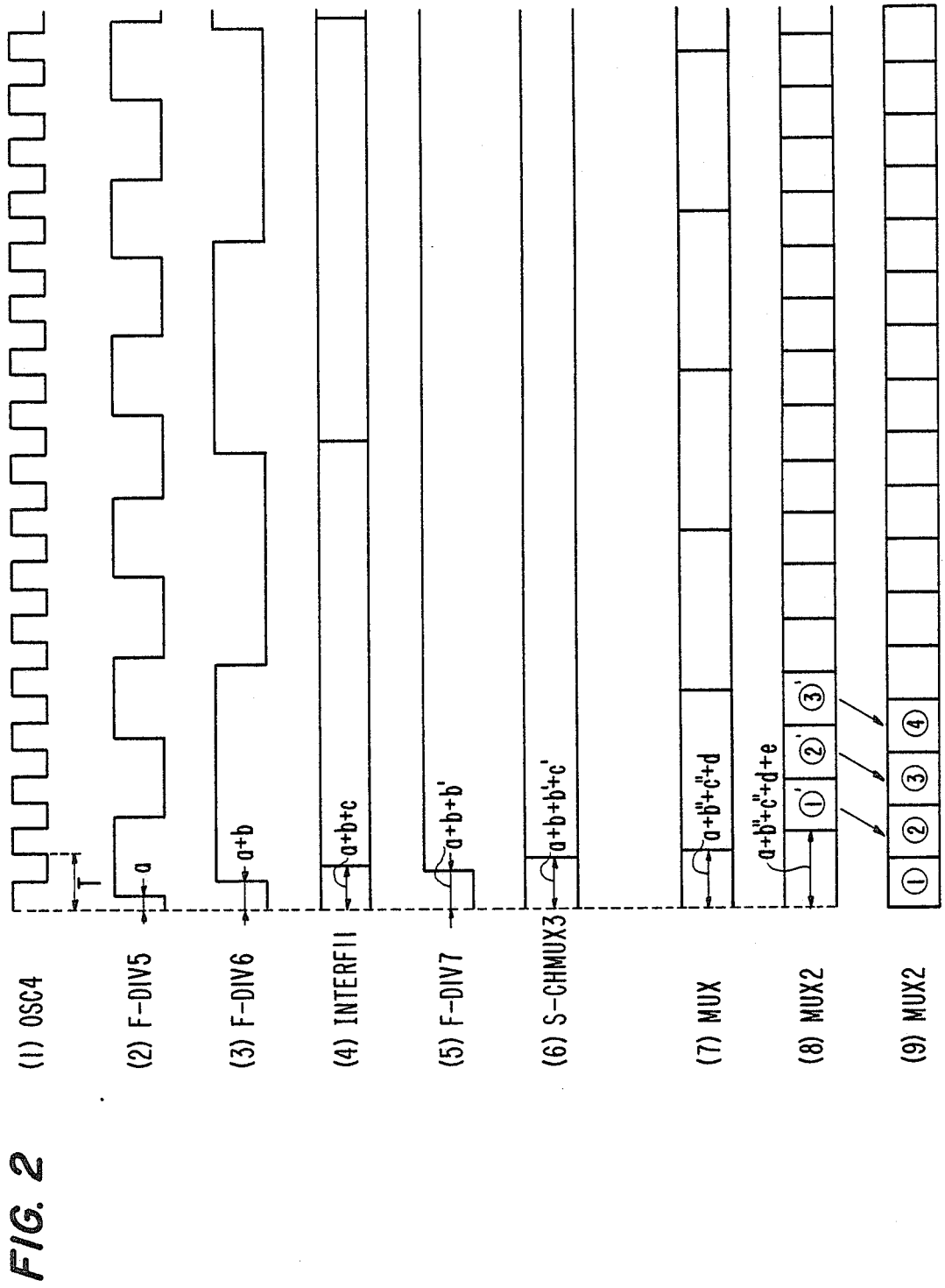
FIG. 2 is a timing chart indicating signal waveforms at respective poins in FIG. 1.

Col. 4, line 17, "poins" should be --points--;
    line 46, "FIG. 1 it" should be --FIG. 1, it--;
    line 67, "generated" should be --generates--.

Col. 5, line 25, "MUV1" should be --MUX1,--.

Col. 6, line 60, "process" should be --processing--;
    line 62, after "second" insert --signal--; and
        after "operating" insert --at--.

UNITED STATES PATENT AND TRADEMARK OFFICE
CERTIFICATE OF CORRECTION

PATENT NO. : 4,811,341

DATED : MARCH 7, 1989

INVENTOR(S) : NAONOBU FUJIMOTO ET AL.

It is certified that error appears in the above-identified patent and that said Letters Patent is hereby corrected as shown below:

Col. 7, line 7, after "said", continue with line 8, with no paragraph indentation;
    line 11, "tot he" should be --to the--;
    line 31, "2:" should be --2, wherein:--;
    line 35, "circuit,;" should be --circuit;--.

Signed and Sealed this

Fifth Day of September, 1989

Attest:

DONALD J. QUIGG

*Attesting Officer*    *Commissioner of Patents and Trademarks*